Sept. 25, 1951 A. P. SCHNAIBLE ET AL 2,569,024
CHARGE FORMING DEVICE
Filed May 7, 1945 3 Sheets-Sheet 1

INVENTOR.
ALBERT P. SCHNAIBLE
FRANK C. MOCK
BY
ATTORNEY

Sept. 25, 1951          A. P. SCHNAIBLE ET AL          2,569,024
                          CHARGE FORMING DEVICE Filed May 7, 1945                                  3 Sheets-Sheet 3

INVENTOR.
ALBERT P. SCHNAIBLE
BY FRANK C. MOCK

ATTORNEY

Patented Sept. 25, 1951

2,569,024

UNITED STATES PATENT OFFICE 2,569,024

CHARGE FORMING DEVICE

Albert P. Schnaible and Frank C. Mock, South Bend, Ind., assignors to Bendix Aviation Corporation, South Bend, Ind., a corporation of Delaware Application May 7, 1945, Serial No. 592,388

9 Claims. (Cl. 123—119)

This invention relates to charge forming devices or carburetors for internal combustion engines, and includes among its objects: to provide a carburetor particularly adapted for aircraft engines which will supply fuel to an engine in a predetermined fuel/air ratio over a wide range of air densities and under varying operating conditions; a carburetor wherein Venturi suction may be maintained substantially constant with increasing altitude for any given air flow; a carburetor wherein the loss or pressure drop resulting from air flow through the carburetor at high velocities is reduced to a minimum; a carburetor which will meter fuel accurately irrespective of changes in air density and hence velocity of flow through the air-intake system; to adapt a variable Venturi air-intake system to carburetors for aircraft engines and especially carburetors of the injection type utilizing a measure of mass air flow to control the fuel flow; to eliminate or modify the effects of so-called "velocity enrichment" in injection carburetors; to provide a carburetor capable of handling wide variations or extremes of intake air density and thereby, among other advantages, adapt it for mounting on the atmospheric side of a two-stage or multiple supercharger system; and otherwise improve the metering or fuel-feeding characteristics of charge-forming devices.

One of the factors which adversely influence accurate metering in injection carburetors for high-altitude aircraft engines is the increase in velocity of the air flowing through the carburetor resulting from a decrease in density as an airplane ascends to high altitudes. The fuel valve which admits fuel to the carburetor and hence controls the fuel metering head is regulated by imposing Venturi differential pressure which constitutes a measure of air flow, commonly termed the "air metering force" on an air diaphragm which tends to open the valve and is balanced for a given air flow by the differential between metered and unmetered fuel, or "fuel metering force" imposed on a fuel diaphragm, which tends to close the valve, the air metering force controlling the fuel metering force. A charge is thus delivered to the engine having a predetermined weight or measure of air and a predetermined weight or measure of fuel. The controlling or actuating force on the air diaphragm is obtained by taking a measure of scoop pressure and conducting same to a pressure chamber located at one side of the air diaphragm and applying Venturi suction to a suction chamber located at the other side of said diaphragm. The suction is usually obtained by means of a small or boost venturi located in a position with respect to the main venturi such that the air leaves the boost venturi at a point of maximum pressure drop in the main venturi, thereby materially increasing the pressure drop at the throat of the boost venturi. The pressure and suction chambers are connected by one or more calibrated mixture control bleeds which permit a predetermined flow of air through the air diaphragm system; and by regulating this flow of air by means of an altitude aneroid, the air metering force is automatically controlled in accordance with air density and hence mass air flow.

The accuracy of metering with such system of carburetion depends on the air flowing through the carburetor following the laws which govern air flow. Assuming an air venturi of constant area, the depression or suction developed at the throat of the venturi varies as the velocity squared times the density. Thus as altitude is gained, for a given air weight flow, the metering suction and also the resistance to flow (carburetor loss) vary inversely as the air density, the metering pressure head (inches of water) varies inversely as the air density, and the fuel/air ratio varies inversely as the square root of the air density. However, there is a limit to the velocity of flow through the venturi above which the laws governing air flow do not hold true due to so-called "compressibility effects" in the air stream. This limit may, for a given size venturi, be 400 to 450 feet per second and beyond this limit the Venturi differential pressure which governs the air metering force increases at a rate greater than the square of the air velocity, causing enrichment of the fuel charge.

Again, with a fixed venturi there is a loss in power resulting from friction as the velocity increases with decrease in density. If a carburetor loss of say .8 inch of mercury be assumed at ground level, the air charge to the engine will be approximately in the proportion of 29.2/30, but at 30,000 feet altitude where the air density is .37 of that at ground level, the pressure drop through the carburetor will be from 8.9" Hg to 6.6" Hg, a loss of approximately 30 per cent of the power.

The ability of a carburetor to handle wide variations of air intake density also adapts it for mounting on the atmospheric side of a two-stage supercharger system and use of the carburetor throttle as the power control irrespective of whether the main or both the main and auxiliary superchargers are active, thereby simplifying the control mechanism, giving added space between the superchargers for an intercooler and at the same time injecting fuel into the main stage supercharger; as contrasted with mounting of the carburetor between stages with the intercooler placed beyond the main stage or engine-driven supercharger where it may condense fuel already vaporized by the supercharger.

Many and varied types of variable venturi and methods of controlling same have been proposed to regulate the fuel charge and avoid frictional losses due to Venturi restriction and thus improve the volumetric efficiency of the engine. The majority of these systems are concerned with automotive engines for ground vehicles, where widely varying air densities are not encountered and hence are not important factors to be considered. Certain types of aircraft engine carburetors utilize variable venturis wherein the Venturi sections function as throttle valves, but here the venturi is regulated in relation to power requirements and not in direct relation to density. The present invention is concerned primarily with regulation of a variable Venturi type of air-intake system for pressure-feed carburetors to maintain air-flow velocity within a certain predetermined range consistent with accurate fuel metering as well as to reduce carburetor loss, and means coacting therewith for metering the fuel in relation to and as a function of mass air flow; although features of novelty and advantage applicable to carburetors generally will become apparent in view of the following description taken in conjunction with the drawings, wherein:

Figure 1:
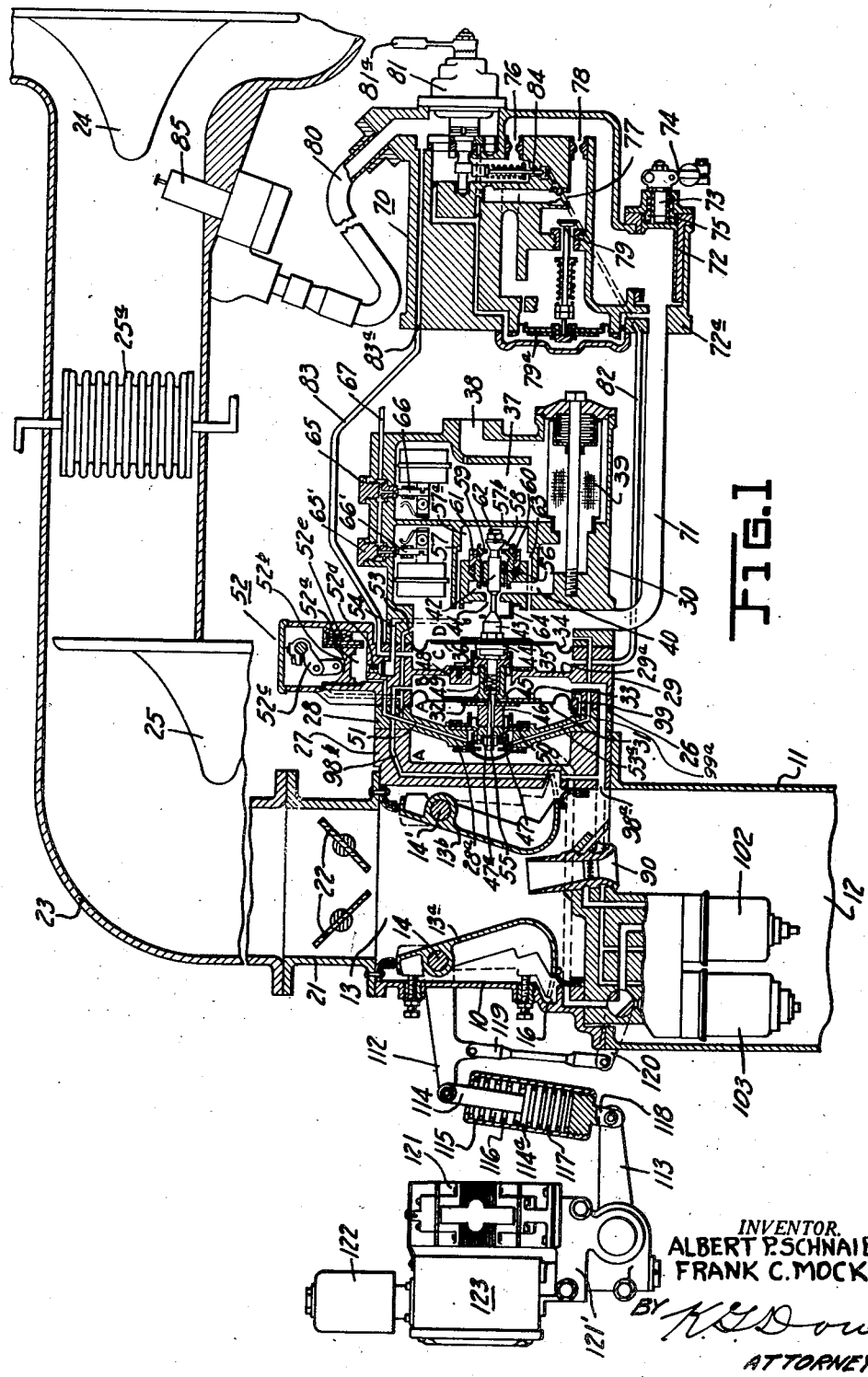
Figure 1 is a sectional diagram of a charge forming device or carburetor in accordance with the invention.
Figure 2:
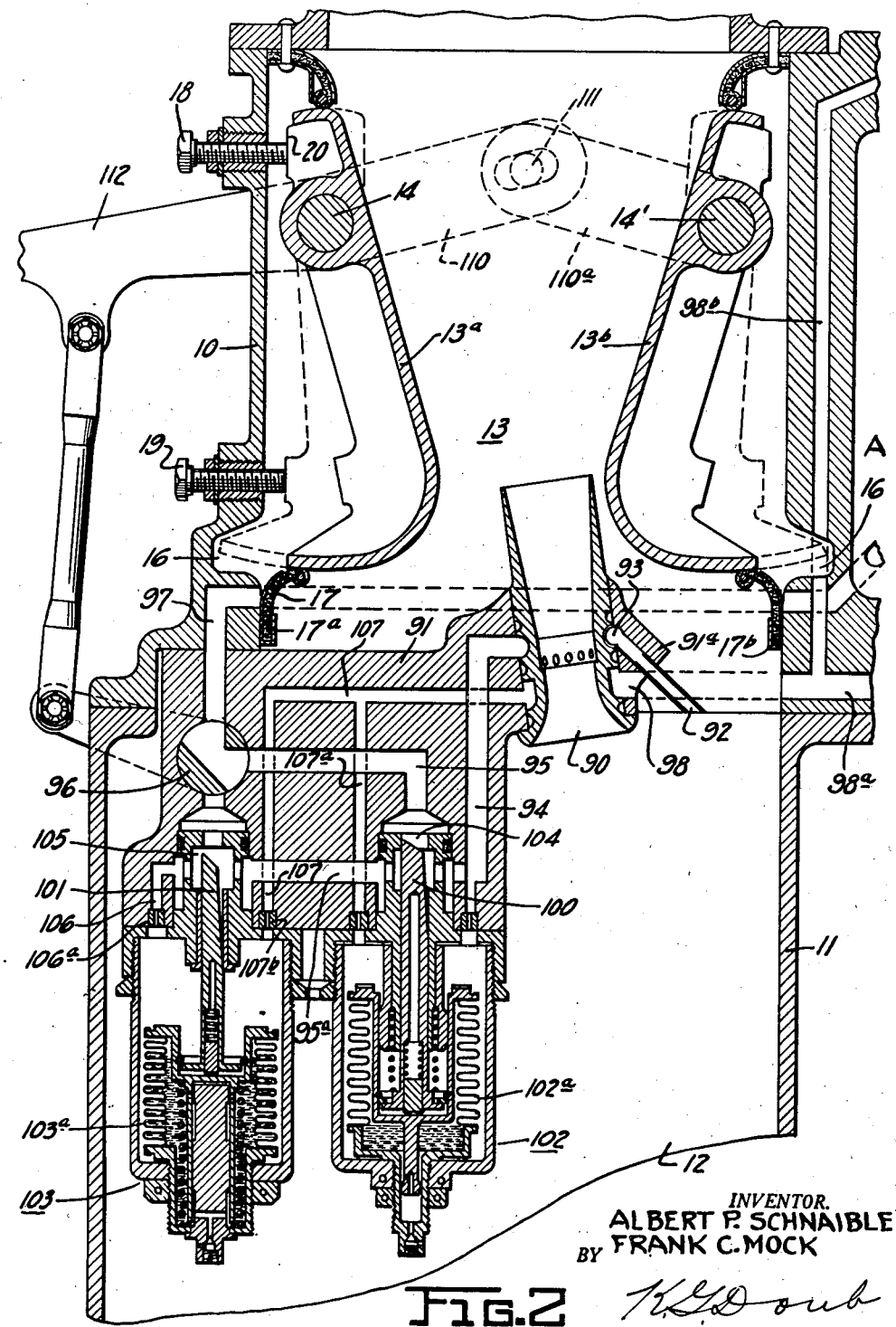
Figure 2 is an enlarged section of the air-intake portion of the carburetor.

The carburetor illustrated in Figures 1 and 2 comprises an air-intake section or body 10 of the up-draft type which is preferably rectangular in interior cross-section, the said body being mounted on the discharge end of an air scoop 11 generally opening in the direction of travel and defining an air-intake passage 12 which directs air into the carburetor.

Within the body 10 is a main venturi 13 defined by a pair of movable sections 13a and 13b secured at their downstream extremities on pivot pins 14, 14' journaled in bearings in the opposite sides of the body. To reduce leakage, the intake edges of the sections 13a, 13b are adapted to engage in recesses 16 formed in the adjacent sides of the body when in their open or maximum flow capacity position; and adjacent each end or edge of the sections is a flexible sealing strip 17 having a rounded or beaded free edge portion which bears against the contiguous rounded edge of the section, said strips being mounted in supporting brackets 17a and 17b suitably anchored to the adjacent wall structure. The sealing strips 17 may be made of any suitable material such as leather, synthetic rubber, gasket material, or the like.

As illustrated herein, the Venturi sections are shiftable from a low altitude position (full lines) to a high-altitude position (dotted lines), it being understood that any number of positions may be found desirable. The low-altitude position is adjustably limited by stops in the form of contact screws 18, and the high-altitude position by like screws 19, the Venturi sections being formed with contact bosses 20 coacting with said screws.

The manner in which the Venturi sections are shifted from one position to another and the operating mechanism therefor will be hereinafter described.

Beyond the body 10 and suitably connected thereto is a throttle body and adapter 21 having rotatably mounted therein a pair of coacting throttle valves 22; and beyond the throttle body is a fuel and air duct or conduit 23 having mounted therein a first stage supercharger 24 and a second stage or auxiliary supercharger 25, an intercooler 25a being mounted between the superchargers.

A fuel regulator unit is generally indicated at 26 (Figure 1) and is adapted to be removably mounted to the barrel 10 and throttle body 21, the said unit being in the form of a series of castings 27, 28, 29 and 30 detachably connected to one another for convenience in assembly and repair and defining air pressure chamber A, air depression or suction chamber B, metered fuel chamber C, and unmetered fuel chamber D; also a relatively large fuel chamber housing a fuel strainer, vapor separator assembly and fuel valve head assembly. Casting 28 is in the form of a spider ring having a hub portion 28a, and casting 29 is provided with a partition wall 29a.

Chambers A and B are separated by a flexible diaphragm 31 which is securely anchored at its outer edge between the castings 28 and 29 and is engaged centrally on one side by a rigid plate 32 and on the opposite side by a thin backing plate 33; while chambers C and D are separated by a flexible diaphragm 34 which is securely anchored at its outer edge between the castings 29 and 30 and is engaged centrally on one side by a plate 35 and on the other side by a thin backing plate 36. Chambers B and C are separated by the rigid wall 29a and the hub assembly supported thereby.

The casting 30 defines a main fuel chamber 37 to which fuel is supplied under pump pressure through inlet port 38 and thence passes through strainer 39 to valve-inlet chamber 40 and from the latter through valve ports 41 and 58 to chamber D of the regulator. Port 41 is controlled by fuel valve 42 forming part of a valve assembly which is shown and described in detail in the copending application of Frank C. Mock Serial No. 538,153, filed May 31, 1944, now U. S. Patent No. 2,500,088. In general, it consists of a plurality of bushings 43, 44, 45, 46, 47 and adjustable stop 47a, the fuel diaphragm being clamped at its center between plate 35 and bushing 44 and the air diaphragm between plate 32 and bushing 45. A sealing diaphragm 48 is secured at its outer edge to the wall 29a and at its center between bushing 45 and a hollow tie rod and guide bushing 49; and a sealing and balance diaphragm 50 of equal area to diaphragm 48 is secured at its outer edge to hub 28a and at its center between bushings 46 and 47. A passage 51 places diaphragm 50 in pressure-communication with piston chamber 52a of an accelerator pump generally indicated at 52 and including a piston 52b provided with operating linkage 52c (which is preferably throttle-actuated), a check valve 52d and a pressure-relief valve 52e. A balance channel 53 having a restriction therein communicates passage 51 with fuel chamber D, and another channel 53a, also having a restriction therein, vents the chamber of diaphragm 50 to said fuel chamber. When the piston 52b is actuated by the throttle or other means, on its upstroke fuel is drawn into chamber 52a from the fuel chamber through passage 54 past valve 52d, and on its downstroke pressure is applied to diaphragm 50 and the fuel valve is opened to correspondingly increase the metering pressure.

An idle spring 55 is located in a chamber defined by the tie rod and guide bushing 49 and functions to maintain a substantially constant metering head when the air metering force acting on diaphragm 31 falls below a certain predetermined value. To permit this spring to so act, the fuel diaphragm 34, fuel valve 42 and bushing 44 are assembled to move in unison as a single unit; and likewise the air diaphragm 31, bushings 45, 46 and 47, guide stem and bushing 49, sealing diaphragms 48 and 50 and associated parts are also assembled to move as a single unit. As long as the air metering force (differential between scoop and Venturi pressures) is above a certain value, or above the idling range, both the air and fuel diaphragms act as a unit on valve 42, but when said force drops below such value, the air diaphragm moves to the left until bushing 47 contacts adjustable stop 47a, whereupon the fuel valve is held open by spring 55 sufficiently to produce a metering head consistent with the desired idling mixture. For a more comprehensive description of the operation of the idling system, reference should be had to application Serial No. 538,153, now U. S. Patent No. 2,500,088, above noted.

A feature of the fuel valve assembly and coacting parts is that means are provided for neutralizing unbalanced forces or load stresses on the fuel and air diaphragms. These unbalanced forces may result from a number of causes. Theoretically, the diaphragms should exactly balance one another in their action on the fuel valve, but there are certain mechanical forces to be reckoned with. Thus, there is a certain amount of elasticity or spring effect in the diaphragm material which tends to resist movement from a neutral position; the area of each diaphragm changes slightly as it unfolds, and there is a suction effect through the discharge orifice as the fuel valve opens which tends to resist opening movement. In the present instance, two fuel discharge orifices and valve members therefor are provided which are so constructed and arranged as to oppose one another and balance out or neutralize these unbalanced forces. The head assembly for the fuel valve 42 is supported and guided by a sleeve 56 formed integrally with a housing 57 defining a chamber 57a, said housing in turn being formed integrally with a partition wall 57b. In addition to the orifice 41, there is fuel-discharge orifice 58 provided by a seat 59 carried by a mounting ring or sleeve 60 adjustably threaded into a hardened steel bushing 61. The right-hand extremity of the fuel valve 42 is provided with a tapered valve member 62 adapted to control the orifice 58. Fuel discharged through orifice 58 flows into chamber 57a and thence by way of channels or ducts 63 into chamber D of the regulator. The respective areas of the discharge orifices 41 and 58 and the tapers of the valve members coacting therewith are correlated in a manner such as to balance the fuel valve and parts coacting therewith throughout the range of movement of the valve. Fuel flowing into chamber 40 is under pump pressure which is always higher than the pressure in chamber D of the regulator, but as the fuel flows through the discharge orifices 41 and 58, there is a suction action which tends to draw their valve members towards closed position, and primarily the balancing is by way of regulating this suction effect so that the force tending to open one valve member is opposed by an equal force tending to close the other valve member, although other factors must be considered, such as pressure differential on opposite sides of the orifices, surface areas exposed to pressure and the flow capacity of the ducts 63.

A baffle 64 serves to diffuse the fuel discharged through orifice 41 and reduce the tendency to form vapor in the system, while the multiple flow channels or ducts 63 act as diffusers for fuel discharged through orifice 58.

The chamber 37 in which fuel is received from the fuel pump (not shown) and unmetered fuel chamber D are provided with vapor-separating systems including vent plugs 65 and 65' respectively, having vents therein controlled by float valves 66 and 66' which open the vents when vapor collects sufficiently to lower the fuel level adjacent the float to a point where the float opens the valve. Vapor so vented flows through line or conduit 67 back to the fuel tank (also not shown).

The fuel control unit, generally indicated at 70, receives unmetered fuel from the regulator 26 by means of fuel passage or conduit 71; it contains idle valve 72 rotatably mounted in a casing 72a and provided with a stem or shaft 73 and arm 74 having a connection with the throttle linkage (not shown), a spring 75 preventing play in the valve mounting. The valve is shown in open position; it receives the initial flow of fuel from conduit 71 and the fuel passes therethrough to the metering jets, three in number in the present instance, viz: automatic lean jet 76, automatic rich jet 77 and power jet 78. A power enrichment valve 79 is provided and is operated by a diaphragm 79a subjected to the differential between unmetered and metered fuel pressure and arranged to open valve 79 when the fuel metering force attains a certain value, the valve 79 constituting the metering element during the early part of the power enrichment range and the jet 78 taking over at higher power flows.

The metering jets are located in flow channels which open into fuel discharge conduit 80 through ports controlled by a manual mixture control valve 81 provided with a handle 81a.

Metered fuel pressure is communicated back to C by means of duct or conduit 82, and said latter chamber is relieved of air or vapor by means of duct or conduit 83 discharging into conduit 80 and having a suitable restriction 83a therein. A regulator fill valve 84 operated by a cam on the shaft of the valve 81 allows chamber C to fill with fuel when the carburetor has been empty; it is held open in all positions of said valve except idle cut-off. This construction is more particularly described and claimed in Patent No. 2,361,227, issued October 24, 1944, to Frank C. Mock.

The conduit 80 conducts metered fuel under pressure to a discharge nozzle 85 located in the conduit 23 and arranged to discharge fuel into the eye of the main stage supercharger 24. Nozzle 85 may be set to open under a predetermined pressure, for example, five to fifteen pounds per square inch.

Reverting now to the air-intake system (best shown in Figure 2), one or more boost venturis 90 are supported by means of a bracket arm 91a projecting from a block 91 located adjacent the throat of the main venturi 13; and a measure of impact or scoop pressure is collected by means of impact tubes 92, also carried by said arm, and communicated to chamber A of the regulator through annular chamber 93, passage 94 and thence either by way of low-altitude passage 95 or high-altitude passage 95a (depending upon the position of selector valve 96 to be described) and passage 97.

Venturi suction is registered in annular chamber 98 of the boost venturi and communicated to chamber B of the regulator by way of passages 98a and 98b.

It will be noted that the boost venturis are located at an angle with respect to the air-intake passage 12. An increase in boost suction has resulted where a plurality of boost venturis are located at an angle with respect to the axis of the riser or scoop adjacent the carburetor deck, due to a more uniform collecting action in this area where the air moves into the mouth of the main venturi. With a straight riser, an angle of approximately 7° to the vertical has produced a marked increase in suction.

At their lower extremities, chambers A and B are connected by a passage 99 (note Figure 1) having mixture control bleeds therein which become increasingly effective to reduce the differential across the air diaphragm as the pressure in chamber A is reduced by the action of needle valves 100 and 101 controlled by density-responsive capsules 102a and 103a forming part of low and high stage automatic mixture control units generally indicated at 102 and 103. Needle 100 controls orifice 104 to thereby control flow of air or impact pressure from passage 94 to passage 95 and thence by way of passage 97 to chamber A when the selector valve is in low stage position (the position shown); while needle 101 controls orifice 105 to thereby control flow of air or impact pressure from passage 95a to passage 97 and thence to chamber A when said valve is in high stage position, or in the next succeeding position if the carburetor has more than two stages.

Preferably, there is a separate automatic control unit specially constructed and adapted for each stage. Thus, unit 102 has its needle 100 specially contoured for density compensation over a range of, for example, ground level to the first supercharger shift altitude, which may be at 17,000 feet, and likewise, its bellows 102a is specially loaded to compensate for densities in this range. With regard to loading, each bellows is preferably responsive to both temperature and pressure, each containing a predetermined amount of damping fluid or oil having low viscosity change with change in temperature and a predetermined amount of a temperature-responsive inert gas such as nitrogen in the space above the oil. The space preferably is partially evacuated, the degree of evacuation being determined in view of the altitude range each bellows is required to handle. Each bellows is spring loaded to prevent collapse of the bellows beyond a predetermined point when the latter is evacuated, and this spring effect is additive to that inherent in the bellows itself. Each needle valve is spring loaded to ensure response to bellows travel, and each valve is contoured to properly control the pressure in chamber A at different inlet air densities encountered over a predetermined altitude range with the main Venturi area fixed for that range.

Exact temperature compensation over widely varying altitudes with a partially evacuated bellows having spring effect is difficult to attain. As the bellows extends, due primarily to spring effect exerting itself as external pressure drops, the difference in pressure between the inside and the outside increases, and the error in temperature compensation increases as the differential between temperature and pressure ratios or combinations increases. When the internal pressure is greater, the bellows will overtravel (overcompensate and cause the fuel/air mixture to lean out), and when the internal pressure is less, the bellows will undertravel (undercompensate and cause enrichment of the mixture). Hence, a compromise is usually accepted with the error tending toward undercompensation or enrichment as temperature increases.

With multi-stage or stepped-area air-intake carburetion utilizing a separate automatic control unit for each stage, a relatively high degree of accuracy in temperature compensation may be attained throughout the entire altitude range, while at the same time the task of needle-contouring and attending design problems becomes much simplified. There is also an added safety factor in that should one of the high stage units fail at high altitude, as by rupture of the bellows or sticking of the needle valve, the unit of the next lower stage will automatically come into operation when the plane descends to an altitude conforming to such lower stage.

The following is an example of individual capsule stage loading for a two-stage carburetor, with the first stage covering an altitude of approximately 15,000 to 17,000 feet: The bellows for the low stage may be approximately 1½ inches O. D.; 1 inch I. D. (in a state of rest); and eight active convolutions having a single-ply beryllium copper wall. Approximately 6½ cc. of oil may be used for the damping fluid, and then adjusted under test if necessary; and the space above the oil evacuated to approximately 27 inches absolute internal pressure at ground level and normal barometric conditions. The overall spring rate, including the loading spring, may be approximately 11 pounds p. s. i. The exact amount of oil per given capacity or size of bellows is difficult to determine without observing the bellows under test, since the physical characteristics and behavior or operation of different bellows vary within a limited range.

For the high stage, the bellows may have the same wall construction and number of convolutions. However, the degree of evacuation in this instance should be higher since it will operate in an altitude range where external pressures are lower. Evacuation to an internal pressure of 15 inches Hg absolute at ground level has been found satisfactory, using approximately 20 cc. of oil as the initial fill. Internal spring rate may be approximately 7 pounds and overall spring rate 17 pounds.

In each instance, the evacuated space above the oil is filled with an inert gas, and in each instance adjustment of the oil fill may be necessary since the oil itself has a certain amount of temperature response, and in practice, it has been found convenient to use the oil fill as a means of adjusting the temperature response of the bellows.

It will be understood that the foregoing can only serve by way of example, since in practice other factors must necessarily be taken into consideration, such as the respective areas of the main venturi for each respective stage, the operating characteristics of the engine to which the carburetor may be applied, the fuel/air ratio, etc.

With respect to needle contouring, this is a matter primarily of test in view of the area of the main venturi at the respective stages, the altitude range over which the needle has control, and the particular characteristics of the automatic control unit.

In the present instance, each bellows 102a, 103a, is vented to scoop pressure by means of ducts or vents 106 having adjustable bleeds 106a therein, and to boost Venturi suction by means of ducts or vents 107, 107a having adjustable bleeds 107b therein. By venting the bellows in this manner, it has been found that compensation for velocity enrichment is improved with respect to units which are vented only to scoop pressure. For a more complete description of Venturi-vented control units reference may be had to the copending application of Frank C. Mock, Serial No. 424,715, filed December 29, 1941, now Patent No. 2,411,287, granted November 19, 1946.

The Venturi-shifting mechanism will now be described:

The pivot pins 14, 14' have secured thereon coacting toggle links 110, 110a, one of the links being slotted and the other link carrying a pin 111 engaging in the slot. Pin 14 also has secured thereon an arm 112 which is operably connected to motor-driven arm 113 by means of a tension coupling (note Figure 1) comprising a link 114 slidable in a sleeve 115 and having on the inner end thereof a disc 114a, springs 116 and 117 being disposed in said sleeve on opposite sides of said disc. The arm 113 connects with the sleeve 115 by means of a link 118 which is threaded into the end of the sleeve to facilitate assembly. The springs 116 and 117 are of sufficient strength to ensure opening and closing of the Venturi sections and at the same time resiliently yet firmly urge them against their stops when the motor-driven arm 113 reaches the end of its driving stroke in either direction.

The arm 112 also connects with the selector valve 96 by means of link 119 and arm 120, so that the valve will be operated in timed relation with the Venturi-shifting operation.

The shift mechanism as herein shown is powered by an electric motor 121 (note Figures 1 and 3) controlled by a density-responsive capsule 122 acting through an electric circuit and switch mechanism housed in a switch box 123. The motor 121 is of the reversible type and is connected to arm 113 through a gear-reduction unit 121'; it has a field coil 121a and reversing coils 121b and 121c. An example of one form of electric circuit suitable for the purpose is diagrammatically illustrated in Figure 3; it utilizes a separate contact circuit to prevent excessive arcing and comprises a plurality of adjustable contacts 124 and 125 (one for each position of the venturi), mounted on a support 126. The capsule or bellows 122 has connected to its movable end a switch arm 127 carrying contact 128 which is connected to a battery or other source of potential 129 by means of wire 130. Contact 124 has connected thereto wire 131 which leads by way of wire 131' through limit switch 132 and wire 131a to solenoid coil 133, the latter being connected to the return side of the circuit by wires 133a and 134. Contact 125 has connected thereto wire 135 which leads by way of wire 135' through limit switch 136 and wire 135a to solenoid coil 137, the latter being grounded or connected to the minus terminal of the battery through wires 137a and 134.

Figure 3:
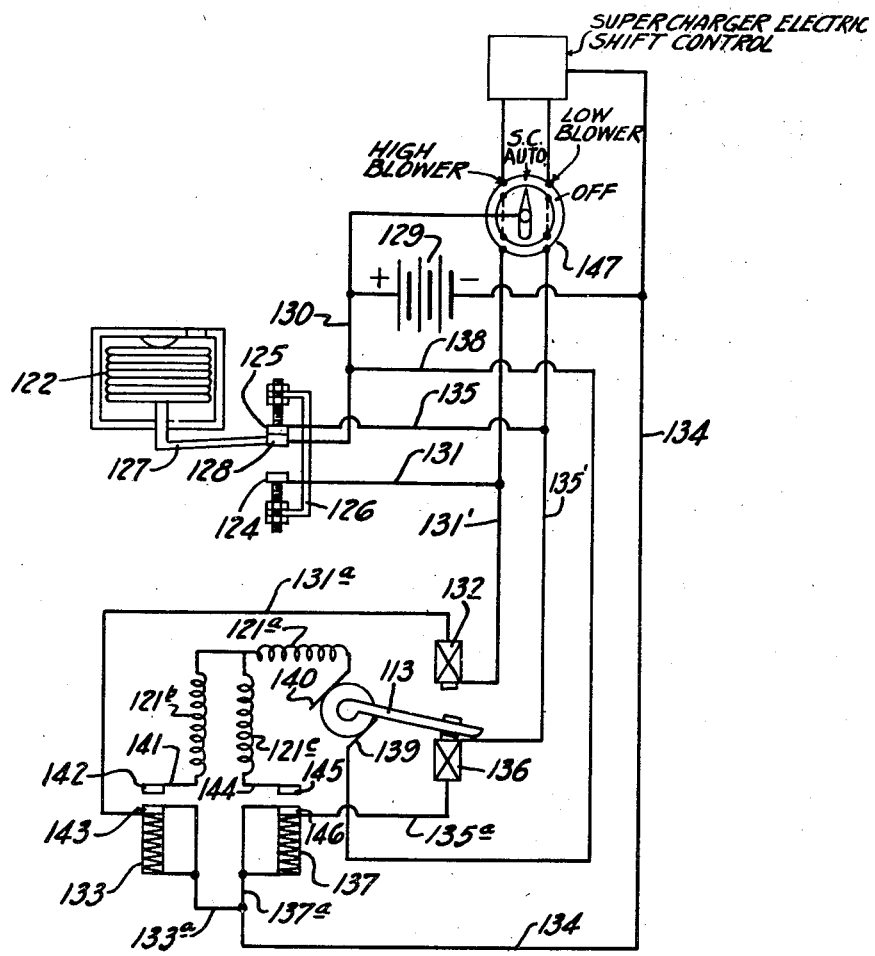
Figure 3 is a diagram of the shift-control unit and electrical circuit therefor.

The motor circuit is by way of wire 138 from the positive side of the battery, through brush 139, armature coil, brush 140, field coil 121a and thence to the return side of the circuit either through coil 121b, wire 141, solenoid contacts 142 and 143 and wires 133a and 134; or coil 121c, wire 144, solenoid contacts 145, 146 and wires 137a and 134, depending upon which set of solenoid contacts are closed. As shown in Figure 3, the parts are in low-altitude position, the bellows 122 being collapsed and the aneroid switch contact 128 is in engagement with contact 125, the circuit being closed from the positive side of the battery through wire 130, contacts 128, 125, wires 135, 135', to limit switch 136. However, this switch is now being held open by arm 113 and the circuit is broken to solenoid coil 137, stopping the motor. When the bellows 122 expands due to a decrease in density over a predetermined altitude range and moves contact 128 into engagement with contact 124, a circuit will be completed from the positive side of the battery through the wire 130, contacts 128, 124, wires 131, 131', limit switch 132 to solenoid coil 133; whereupon contacts 143 and 142 will close and the circuit to the motor will be completed from the positive side of the battery through wire 138, brush 139, motor armature coil (not shown), brush 140, field coil 121a, reversing coil 121b, contacts 142, 143 and thence to the minus terminal of the battery through wires 133a, 134. By positioning the adjustable contacts 124 and 125 with respect to the bellows 122 and to each other, the altitudes at which the shift from low-altitude to high-altitude position and the shift from high-altitude to low-altitude position will occur can be selected.

The electric circuit of Figure 3 is shown connected into the supercharger shift circuit so that the aneroid 122 also functions to automatically shift the supercharger from low to high blower and vice versa in timed relation to shifting of the venturi. A manual switch is indicated at 147 whereby the supercharger may be manually disconnected or shifted independently of the aneroid 122 and also independently of the carburetor. It is shown in "automatic" position. By turning the switch button in a clockwise direction, the switch hand may be caused to engage low blower contact and at the same time break the automatic circuit; and by turning the switch button in a counterclockwise direction, the hand may be caused to engage high blower contact and at the same time break the automatic circuit. By turning the switch button to an intermediate position, the supercharger circuit may be fully disconnected from the Venturi shift circuit, whereupon the supercharger may be controlled by any suitable means independently of the carburetor.

A general description of the operation follows:

As shown in Figures 1 and 3, the Venturi sections of the carburetor are closed in the low altitude position, the bellows 122 being in its retracted state and the contacts 128 and 125 being in engagement. The circuit has been completed through the reversing coil 121b and the motor-driven arm 113 has swung over in contact with the limit switch 136, holding the latter open and stopping the motor. The Venturi sections will remain in this position up until the time the pressure of the air surrounding the aneroid 122 drops to a point where the bellows will extend itself and move the contact 128 in engagement with the contact 124 whereupon the circuit will be closed from the battery through wire 130, contacts 128, 124, wires 131, 131', limit switch 132 and wire 131a to solenoid coil 133, and the motor will be reversed, thereby opening the Venturi sections to high-altitude position. This altitude may be around 15,000 or 17,000 feet. Also, up until this altitude is reached and exceeded, the supercharger will be in low blower.

When the engine is in operation, air is drawn into the air scoop 11 and thence through the boost venturi 90 and main venturi 13, and a differential pressure is created between the throat of the venturi 90 and the air inlet which, at constant entering air density, is proportional to the square of the quantity of air flowing. These respective pressures are transmitted to chambers A and B on opposite sides of the air diaphragm 31 and create a net force on the diaphragm tending to open the fuel valve 42, this force usually being termed the "air metering force." If this force were unopposed, the fuel valve 42 would tend to move to full open position; but when the valve opens, fuel under pressure flows into unmetered fuel chamber D and through conduit 71 to the fuel control body or unit, where it flows through any one or more of the respective metering orifices, depending upon the position of the manual control valve 81, and thence to the discharge nozzle 85 through conduit 86, from which it is discharged under a nozzle pressure of, for example, 5 pounds to the air stream flowing to the engine. Chamber D is subjected to unmetered fuel pressure and chamber C to metered fuel pressure, and the differential between these respective pressures acts upon diaphragm 34 tending to move the fuel valve 42 to the left, or in a direction to close the valve. This force is commonly termed the "fuel metering force" and it opposes the air metering force. The valve 42 is thus caused to adjust itself to a point of equilibrium such that the differential pressure across the fuel metering orifices is equal to the differential between the air inlet and venturi, whereby constant fuel/air proportioning is maintained. As engine speed is decreased, the rate of air flow through the venturi is decreased, thereby decreasing the differential pressure acting on diaphragm 31, causing valve 42 to move towards closed position and thus decrease the fuel flow to compensate for decreased rate of air flow. Thus the air metering force controls the fuel metering force.

Since the Venturi - to - air - scoop - differential pressure increases for a given rate of mass air flow, upon a decrease in entering air density, the differential pressure across diaphragm 31 will tend to increase, thereby increasing the fuel flow and enriching the mixture. The automatic control units 102, 103 coact with the calibrated bleeds 99a in channel 99 between chambers A and B to prevent such enrichment, said bleeds being substantially ineffective to vary the differential pressure in these chambers and across air diaphragm 31 at such times when the needle valve 100 (or 101) is in open position, as at ground level, but becoming increasingly effective in reducing the differential pressure as said needle progressively restricts said passage with increase in altitude. Thus for any given mass air flow, needle valve 100 (or 101) will so restrict passage 94, 95, 97 with variations in altitude that the differential pressures in chambers A and B will remain constant notwithstanding that the differential in the pressure at venturi 90 and impact tubes 92 increases with a decrease in entering air density. By this means automatic altitude compensation is obtained for each fixed Venturi area.

The Venturi differential pressure for a given size of venturi and constant entering air density will normally vary substantially as the square of the velocity, but this law does not hold true in the extremely high velocity ranges, for example at a velocity of 400 to 450 feet per second through the main venturi. The altitude at which this rate of flow may be reached varies with the area of the venturi, supercharger pressure, throttle position and other factors. Again, since suction bears a definite relation to area as well as density, in order to obtain adequate metering suction at low air flows, the Venturi area must be maintained within certain limits. Hence the low altitude position of the venturi 13 should be calibrated with a view towards obtaining the desired metering suction through the boost venturi at low air flows while at the same time avoiding high losses due to friction (pressure drop through the carburetor) at high air flows. Since the pressure drop through the boost venturi is in direct relation to the pressure drop through the main venturi, the differential will remain in balance irrespective of a change in area of the main venturi up until such time as the velocity through the boost venturi reaches critical. Thus a nominal main Venturi velocity of between 400 to 450 feet per second may not be critical for the main venturi but would be critical for the boost venturi, and this would be the determining factor in arriving at the shift velocity. The multi-stage carburetor provides adequate metering suction at low air flows, accurate air metering force at high air flows with reduced carburetor loss.

When the shift altitude is reached, the bellows 122 will have extended itself to a point where the contact 128 engages contact 124, whereupon the circuit is completed from the battery through wire 130, contacts 128 and 124, wires 131, 131', limit switch 132, wire 131a and solenoid coil 133, causing contacts 142 and 143 to close and establishing a circuit from the battery through wire 130, the motor, field coil 121a, reversing coil 121b and back to the battery through wires 133a and 134. The motor will then be reversed and the arm 113 will turn in a direction such as to move the toggle links 110, 110a downwardly and spread the Venturi sections 13a, 13b to the high altitude position as shown in dotted lines.

At this point attention is directed to the function of the linkage mechanism housed in the sleeve 115. When the Venturi sections open or close to a point where they engage the contacts 19 or 18, the arm 113 still moves some distance further and compresses either the spring 116 or 117 until the arm contacts limit switch 136 or 132. When the arm engages the limit switch toward which it is moving, the circuit through the switch is broken and the motor stops, the overrun functioning to compress one of said springs and hold the Venturi sections against their stops under tension. This serves to hold said sections stable.

As the arm 112 rotates to open or close the Venturi sections, it also rotates the selector valve 96 to a position where either the control unit 102 or 103 will be placed in operation. In Figures 1 and 2, the valve is shown in the low altitude position, and hence the control unit 102 will regulate the area of the passage 94, 95, 97; but when the sections are opened to the high altitude position, passage 95 is closed and impact pressure is communicated to chamber A through passage 94, 95a, 105, 97. In the high altitude position, the operation is the same in all respects as in the low altitude position, the needle 101 being contoured to properly adjust the air metering force in relation to entering air density. With the Venturi area enlarged, the velocity will be decreased. However, the needle valve 101 of the control unit 103 is specially contoured to take care of the change in area consistent with entering air density.

An important advantage with a multi-stage venturi and coacting controls as herein disclosed is that the regulator unit and control body may be used interchangeably with either a fixed or a variable Venturi type carburetor of like rating without changing the mixture control bleeds and metering orifices.

It will be noted that the change in Venturi area is abrupt and not gradual. In practice, it has been possible to actuate the sections with such rapidity as to not materially affect control of the air metering force.

While in practice, the differential is created by means of a boost venturi, it will be apparent that other means could be adopted for creating a differential pressure on the air diaphragm. Thus the depression at the throat of the main venturi could be used in conjunction with impact pressure at the carburetor deck, and a boost venturi dispensed with, or the suction could be taken from any point in the air intake conduit where it varies with air flow and change in Venturi area.

In regard to the shift control, while in practice a density-responsive capsule has been found satisfactory, yet it will be obvious that other methods of control can be used. For example, the capsule could be made responsive to changes in manifold pressure, carburetor drop or some other operating function of the engine which varies with air-intake density; or a device could be used which would be sensitive to changes in velocity and which would become effective when the velocity attained a certain value.

Although the construction and arrangements have been described in connection with a carburetor wherein the fuel is delivered into the induction passage leading to the engine, it will be obvious that they are equally applicable for use in systems wherein the fuel is introduced directly into the engine cylinders or into the manifold adjacent the intake valves of the engine, or into the induction passage at any desired point, either anterior or posterior to the throttle.

It will be understood that the foregoing and other construction and arrangement of the parts of the carburetor as well as in the controls therefor may be adopted without departing from the spirit and scope of the invention as defined in the appended claims.

We claim:

1. In a charge-forming device having an air-intake passage provided with a variable venturi and a fuel-metering passage provided with a fuel valve for regulating the metering head and controlled by pressure-responsive means subjected in a valve-opening direction to a differential air pressure emanating at the venturi and varying in relation to air flow and in a valve-closing direction to a differential fuel pressure varying in relation to fuel flow, means for abruptly varying the area of the venturi when the air in the intake passage is at a predetermined density to thereby maintain the velocity of flow within limits consistent with accurate fuel valve control, the area of the venturi remaining fixed over ranges of velocity within such limits, devices responsive to changes in air density arranged to automatically adjust the air differential pressure in relation to air density to thereby maintain the fuel/air ratio proportional to mass air flow, there being a separate independently-operating device for each velocity range, and means synchronized with said Venturi area varying means automatically synchronizing the operation of each device with its related range.

2. In a charge-forming device having an air-intake passage provided with a variable venturi and a fuel-metering passage provided with a fuel valve for regulating the metering head and controlled by pressure-responsive means subjected to a differential air pressure emanating at the venturi and varying in relation to air flow opposed by a differential fuel pressure varying in relation to fuel flow, means for abruptly varying the area of the venturi when the air in the intake passage is at a predetermined density to thereby maintain the velocity of flow consistent with accurate fuel valve control, the air-differential pressure being communicated to said pressure-responsive means through a plurality of ports arranged in parallel, a separate valve controlling each port, an element responsive to changes in air density automatically controlling each valve, and means for automatically opening or closing a preselected port upon a change in Venturi area.

3. In a charge-forming device having an air-intake passage provided with a variable venturi and a fuel-metering passage provided with a fuel valve for regulating the metering head and controlled by pressure-responsive means subjected in a valve-opening direction to a differential air pressure emanating at the venturi and varying in relation to air flow and in a valve-closing direction to a differential fuel pressure varying in relation to fuel flow, means for abruptly varying the area of the venturi when the air in the intake passage is at a predetermined density to thereby maintain the velocity of flow within limits consistent with accurate fuel valve control, the area of the venturi remaining fixed over ranges of velocity within such limits, the air-differential pressure being communicated to said pressure-responsive means through a plurality of ports arranged in parallel, a separate valve controlling each port and an element responsive to changes in air density automatically controlling each valve, and a selector valve operated in timed relation to said velocity-varying means arranged to automatically cut said ports in or out as per their related ranges.

4. In a charge-forming device having an air-intake passage provided with a variable main venturi and a fixed boost venturi and a fuel-metering passage provided with a fuel valve for regulating the metering head and controlled by pressure-responsive means subjected to the air differential between impact pressure and Venturi suction opposed by the differential between metered and unmetered fuel pressure, means for varying the area of the main venturi, means responsive to changes in density for operating said Venturi-varying means and arranged to change the area of the main venturi abruptly and in steps inversely with respect to the air density and thereby maintain the velocity of flow through the boost venturi within predetermined limits, a plurality of devices responsive to changes in air density arranged to automatically adjust the air-differential pressure to thereby maintain the fuel/air ratio proportional to mass air flow at all altitudes, there being an independently-operating device for each stepped area of the main venturi, and means for automatically rendering a preselected device effective or ineffective upon a change in Venturi area.

5. In a charge-forming device for an internal-combustion engine having an air scoop defining an air-intake passage, a variable main venturi and a fixed boost venturi, a fuel metering passage provided with a fuel valve for regulating the metering head and controlled by pressure-responsive means subjected in a valve-opening direction to the air differential between scoop pressure and Venturi suction and in a valve-closing direction to the differential between metered and unmetered fuel pressure; means for varying the area of the main venturi, means responsive to changes in air density for operating said Venturi-varying means and arranged to change the area of the main venturi abruptly and in steps inversely to air density and thereby maintain the velocity of flow through the boost venturi within predetermined limits, a plurality of elements responsive to changes in air density arranged to automatically adjust the air-differential pressure to thereby maintain the fuel/air ratio proportional to mass air flow at all altitudes, there being an independently-operating element for each step of area of the main venturi, and means timed with the operation of said Venturi-varying means for selectively cutting said elements in or out in relation to the particular area controlled thereby.

6. In a charge-forming device for an internal-combustion engine having an air scoop defining an intake passage, a main venturi made up of movable sections, a fixed boost venturi associated with the main venturi, a fuel valve and means for subjecting said valve to the differential between scoop pressure and Venturi suction, means for shifting said sections to vary the area of the main venturi and thereby prevent the air flowing through the boost venturi from attaining a velocity such as will result in substantial "compressibility effects" and produce error in the differential, and means responsive to changes in air density for effecting operation of said shifting means abruptly and in steps defining limits of velocity as determined by changes in air density.

7. In a charge-forming device, an air-intake passage having a venturi therein made up of movable sections actuatable to different relative positions to vary the area of the venturi, power means operatively connected to said sections for intermittently actuating the same, stops positively limiting the extreme positions of said sections, and a resilient connection interposed between said power means and said sections functioning to resiliently urge the sections against their stops and maintain the sections stable in operation.

8. In combination with an engine having an air-intake passage provided with a variable-speed supercharger and means responsive to changes in density for varying the speed of the supercharger at predetermined altitudes, a charge-forming device having a variable venturi disposed in said passage, and means for varying the area of the venturi having an operative connection with said first-named means to be rendered effective thereby.

9. In combination with an engine having an air-intake conduit provided with a variable-speed supercharger and means for varying the speed of the supercharger at predetermined altitudes including an electric circuit and an element responsive to changes in density controlling said circuit, a charge-forming device having a variable venturi disposed in said passage, and means for varying the area of the venturi including an electric circuit provided with an energizing switch operated by said element.

ALBERT P. SCHNAIBLE.
FRANK C. MOCK.

REFERENCES CITED

The following references are of record in the file of this patent:

UNITED STATES PATENTS

| Number | Name | Date |
| --- | --- | --- |
| 1,095,767 | Adams | May 5, 1914 |
| 1,645,178 | Hall-Brown | Oct. 11, 1927 |
| 2,187,737 | Gregory | Jan. 23, 1940 |
| 2,264,869 | Beardsley | Dec. 2, 1941 |
| 2,281,411 | Campbell | Apr. 28, 1942 |
| 2,290,884 | Kollman | July 28, 1942 |
| 2,303,640 | Hogg | Dec. 1, 1942 |
| 2,310,831 | Bielitz | Feb. 9, 1943 |
| 2,361,227 | Mock | Oct. 24, 1944 |
| 2,367,499 | Holley | Jan. 16, 1945 |
| 2,399,079 | Udale | Apr. 23, 1946 |

FOREIGN PATENTS

| Number | Country | Date |
| --- | --- | --- |
| 363,339 | Great Britain | June 13, 1930 |